Nov. 12, 1968  W. SCHÜLER  3,410,602
ANTIGLARE DEVICE
Filed Sept. 30, 1965  2 Sheets-Sheet 1
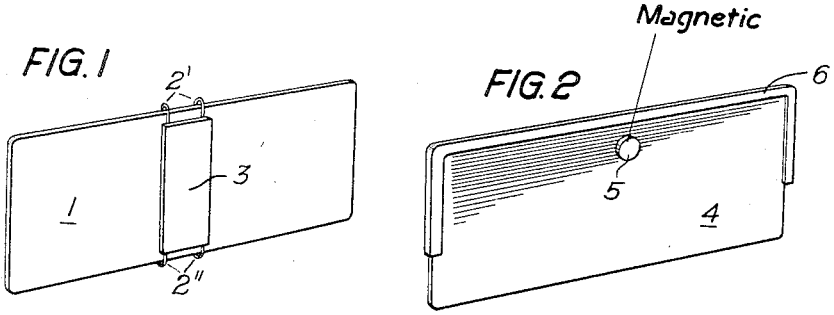
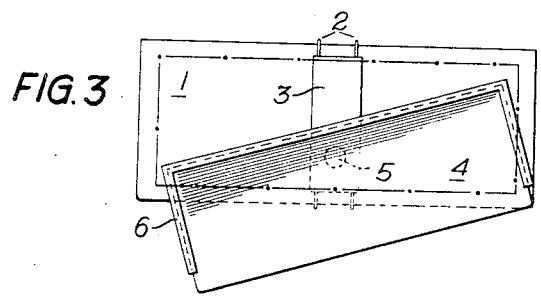
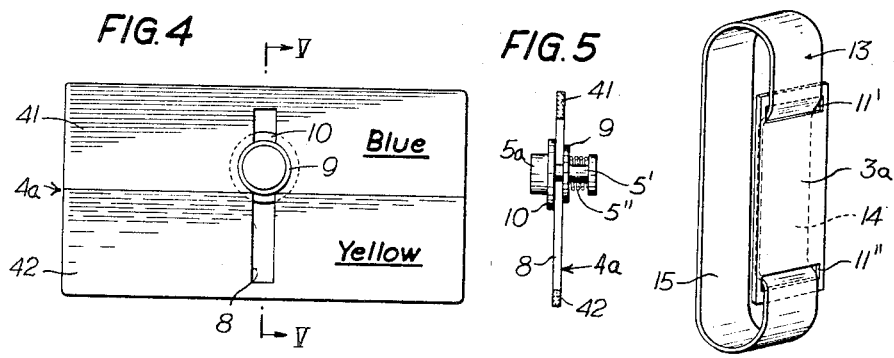
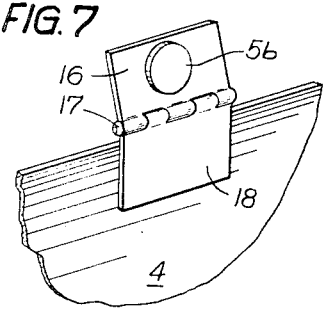
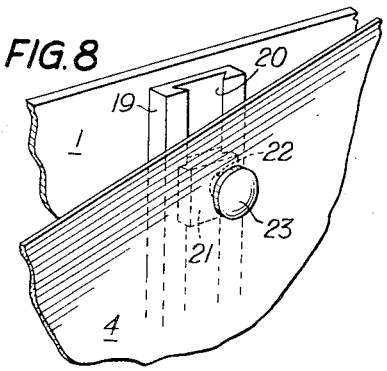
Werner Schüler
INVENTOR
Karl G. Ross
Attorney Nov. 12, 1968 W. SCHÜLER 3,410,602
ANTIGLARE DEVICE
Filed Sept. 30, 1965 2 Sheets-Sheet 2
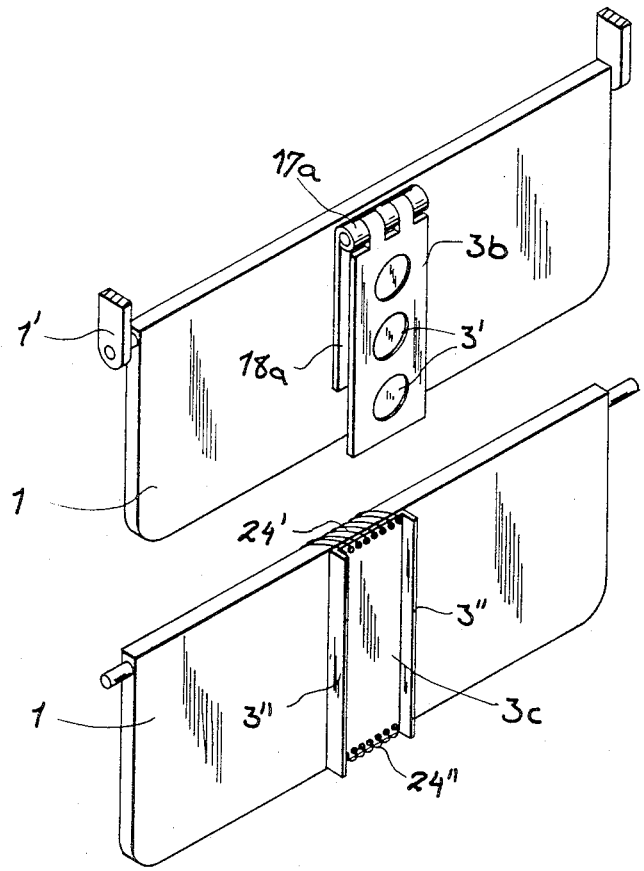
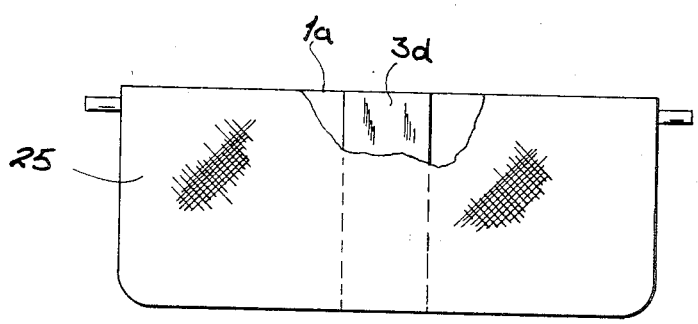
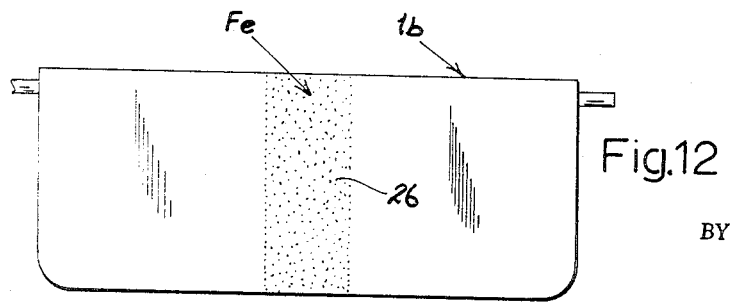
Werner Schüler
INVENTOR.
BY Karl F. Ross
Attorney

United States Patent Office 3,410,602
Patented Nov. 12, 1968

3,410,602
ANTIGLARE DEVICE
Werner Schüler, Turkenstr. 29,
Munich, Germany
Filed Sept. 30, 1965, Ser. No. 491,623
Claims priority, application Austria, Oct. 8, 1964,
A 8,567/64
11 Claims. (Cl. 296—97)

ABSTRACT OF THE DISCLOSURE

A light-shield assembly attached to a sun visor for an automotive vehicle wherein the sun visor is provided with a narrow removable vertically extending laterally shiftable ferrometallic strip, the tinted transparent light shield carrying a cylindrical permanently magnetic stud adapted magnetically to adhere to the strip and constituting with the strip and sole means for attaching the shield to the visor. A hinge with frictionally articulated arms is included between the strip and the visor or between the stud and the shield for selectively retaining the shield in various positions about the hinge axis.

My present invention relates to an antiglare device designed to protect the driver of an automotive vehicle against blinding by the headlights of oncoming cars or by incident sunlight.

The general object of this invention is to provide a glare-protection assembly of this type which can be conveniently adapted to a variety of driving conditions.

A more particular object of this invention is to provide simple and dependable means for adjustably securing a transparent antiglare light shield to a conventional sun visor.

In accordance with the present invention I provide, in combination with a conventional sun visor for automotive vehicles, a tinted transparent light shield and fastening means for selectively securing this light shield to a driver-confronting surface of the visor in one of several positions, i.e. a raised withdrawn position and one or more downwardly extending operative positions, the fastening means including a projecting stud on the light shield about which the latter is free to be at least partially rotated so that a larger or smaller portion of that shield may extend downwardly beyond the lower edge of the visor as an antiglare device.

Advantageously, the light shield is of generally rectangular shape and substantially coextensive with the visor when in its withdrawn position. It may then be swung about its pivotal axis, i.e. about the axis of the stud by which it is fastened to the visor at one point, so that, for example, only a triangular part of the shield projects downwardly beyond the visor to screen the eyes of the driver from oncoming headlights on the left while giving him a clear view of the road on the right. At other times, e.g. with the sun standing low above the horizon in front of the car, the driver may lower the entire light shield into a position in which at least a major part thereof will extend downwardy over substantially the full width of the visor.

In order to afford a maximum degree of adjustability, I prefer to dispose the mounting stud close to the horizontal upper edge of the light shield and to provide means to facilitate the shifting of this stud along a vertical median zone of the visor. The stud, for this purpose, may terminate in a swivelable tenon engaging a vertically motrised member on the visor, or more simply may be permanently magnetized so as to adhere to a ferromagnetic surface portion of the visor. In the latter case I may coat the visor on the driver's side, over at least part of its surface, with iron powder or, even more simply, I may provide a ferrometallic strip secured to the visor and preferably demountable therefrom. A strip of this type may be provided with adjustable mounting means for enabling its attachment to visors of various shapes and sizes.

The invention will be described in greater detail with reference to the accompanying drawing in which:

FIG. 1 is a perspective view of a sun visor for automotive vehicles provided with a ferromagnetic retaining strip forming part of a glare-protection assembly according to the invention;

FIG. 2 is a similar perspective view of a light shield adapted to co-operate with the elements of FIG. 1;

FIG. 3 is a face view of an assembly of the elements shown in FIGS. 1 and 2, with the light shield thereof in a partly swung-out operative position;

FIG. 4 is a face view of a slightly modified light shield for an assembly according to the invention;

FIG. 5 is a cross-sectional view taken on the line V—V of FIG. 4;

FIG. 6 is a perspective view of a modified retaining strip;

FIG. 7 is a fragmentary perspective view of a light shield with a different type of fastening means;

FIG. 8 is another fragmentary perspective view, showing yet a further type of fastening means;

FIGS. 9 and 10 are perspective views similar to FIG. 1, illustrating two other kinds of retaining strip;

FIG. 11 is a face view of a visor, with parts broken away, ilustrating an alternate mode of attaching a retaining strip thereto; and FIG. 12 represents a further face view of a visor provided with still another form of retaining means.

FIG. 1 illustrates a conventional automotive sun visor 1, having means (not shown) for swingably attaching it to the inner frame of a car above the windshield, along with a strip 3 of sheet steel removably clipped onto the visor 1 by upper and lower links 2', 2" terminating in hook-shaped extremities. The links 2', 2" are preferably elastic elements, such as coil springs, to facilitate the attachment of strip 3 to visors of different height. Although the strip 3 is shown positioned at the center of the visor 1, is can be easily shifted to the right or the left as required.

FIG. 2 illustrates a transparent light shield 4 of suitably tinted glass or plastic material, the shield being surrounded on three sides by a frame 6 of inverted U-shape. A permanently magnetized stud 5 of ferromagnetic material projects horizontally from the front surface of light shield 4, i.e. from its surface facing away from the driver of the vehicle, for contact with the exposed surface of ferrometallic strip 3. Magnet 5 may be pasted or otherwise secured to the light shield 4 at a location close to the center of its horizontal upper edge. As will be apparent from FIG. 3, this arrangement enables the shield 4 to be swung into a partly projecting position (solid lines) from a withdrawn position (dot-dash lines) in which the light shield is substantially coextensive with the visor 1. Naturally, the light shield 4 may also be tilted in the opposite direction or may be maintained horizontal while being slid downwardly to the full extent permitted by the interengagement of magnetic stud 5 and strip 3.

In FIGS. 4 and 5 I have shown a slightly modified light shield 4a centrally formed with a vertical slot 8 which is traversed by a stem 5' of a magnetic stud 5a; two disks 9 and 10 are also penetrated by the stem 5' on opposite side of the shield 4a, a compression spring 5" bearing upon the disk 9 and upon the enlarged head of stem 5'. By virtue of this pressure fit the stud 5a can be easily slid along the slot 8 to any convenient position about which the shield 4a is to be swung. As further shown in FIG. 4, shield 4a is divided into two horizontal zones 41 and 42 of different tint, the upper zone 41 being tinted blue while the lower one is tinted yellow so that the eye of the driver becomes gradually accustomed to increasing brightness as it sweeps down across the light shield 4a.

In FIG. 6 I have shown a modified strip 3a provided with a pair of transverse slots 11', 11" at the top and the bottom, respectively, this strip being mounted on a visor such as the one shown in FIG. 1 by an endless elastic band 13 passing through the slots 11' and 11". The band 13 thus has one vertical reach 14, normally concealed by the strip 3a, and another vertical reach 15 looped around the visor. This arrangement, like the one illustrated in FIG. 1, allows the strip 3a to be fitted onto generally rectangular visors of different height.

In FIG. 7 I have shown the upper part of a light shield 4 to which a magnetic stud 5b is fastened by having a base 16 hinged at 17 to a mounting plate 18 adhesively or otherwise secured to the light shield. Base 16 and plate 18 may both consist of sheet metal. Hinge 17 may interconnect the parts 16 and 18 with sufficient frictional resistance to insure the retention of light shield 4 in a raised position whenever it is desired to swing this shield away from its supporting visor surface about the hinge axis. Naturally, the hinge 17 is representative of a variety of joints by which the two plates 16 and 18, or their equivalents, may be connected to each other.

In the embodiment of FIG. 8, the visor 1 has fastened to it a vertical channel member 19 with a mortise 20. A stud 22 is designed as a screw-threaded bolt terminating in a square tenon 21 matingly engaging in the mortise 20; the other end of bolt 22 is threadedly engaged by a head 23 adapted to clamp the light shield 4, traversed by the bolt 22, in a selected angular and elevational position by simultaneously immobilizing the shield with reference to the bolt and the latter with reference to channel member 19. Tenon 21 and bolt 22 are, of course, free to rotate with reference to the light shield 4 when the knob 23 is loosened.

In FIG. 9 I have illustrated a reversal of the arrangement of FIG. 7 including a ferrometallic strip 3b swingably connected by hinges 17a to a plate 18a which is fixedly secured to the visor 1; a hinged mounting for the visor itself is shown at 1'. Strip 3b is seen to have a series of circular depressions 3' designed to receive a magnetic stud, such as the one shown at 5, 5a or 5b, in different elevational positions of its associated light shield. The presence of these depressions permits the use of weaker magnets without danger of dislodgment.

FIG. 10 shows a strip 3c provided with a pair of lateral shoulders 3" also designed to confine the associate magnet to the strip surface; strip 3c is here fastened to visor 1 by stitching 24', 24", e.g. of nylon. Naturally, displacement-limiting formations such as depressions 3' or shoulders 3" may also be provided on the strips 3 or 3a of preceding embodiments.

As illustrated in FIG. 11, a strip 3d may be concealed from view by a thin surface lawer 25 (e.g. of fabric) covering a visor 1a on the side of the driver.

Finally, according to FIG. 12, a visor 1b may be provided on the driver's side with a layer 26 of magnetizable particles (e.g. iron powder) taking the place of the retaining strip described above.

Modifications of the embodiments specifically described and illustrated, including combinations of compatible features thereof, are of course possible without departing from the spirit and scope of my invention except as limited by the appended claims. In particular, the magnetic or other mounting studs may be made detachable from the associated light shields so that transparent foils of different shadings or hues may be readily interchanged.

I claim:

1. A glare-protection assembly for automotive vehicles, comprising:
   a sun visor member provided with a substantially vertically positionable driver-confronting surface;
   a tinted transparent light shield member disposed substantially parallel to said surface; and
   fastening means including a permanently magnetized projecting stud on said light shield member for selectively attaching same to said surface in an upwardly withdrawn and in at least one downwardly extending operative position with freedom of at least partial rotation of said light shield member about said stud, said surface being formed at least in part of a ferrometallic strip on said visor member, and a friction hinge having one arm constituting said strip and engaging said stud and another arm mounted upon said visor member, said arms being articulated with friction, thereby retaining said shield member in selected positions about the hinge axis.

2. An assembly as defined in claim 1 wherein said one of said arms is provided with a plurality of depressions selectively engageable by said stud for preventing lateral displacement of the latter.

3. An assembly as defined in claim 1 wherein said other arm is a mounting plate fixedly secured to an edge portion of said light shield member and said one of said arms is a base for said stud hingedly attached to said mounting plate.

4. An assembly as defined in claim 1 wherein said light shield member is substantially coextensive with said surface in said withdrawn position.

5. An assembly as defined in claim 4 wherein said light shield member is generally rectangular and said stud is disposed close to the center of a horizontal upper edge of said light shield member.

6. An assembly as defined in claim 1 wherein said strip is provided with mounting means removably securing it to said visor.

7. An assembly as defined in claim 6 wherein said mounting means comprises a set of elastic links with hook-shaped extremities.

8. An assembly as defined in claim 6 wherein said mounting means comprises an elastic band removably surrounding said visor, said strip being formed with a pair of slots traversed by said band.

9. An assembly as defined in claim 1 wherein said strip extends vertically across a median zone of said visor.

10. An assembly as defined in claim 9 wherein said strip is provided with lateral edges for preventing a sliding of said stud off said strip.

11. A glare-protection assembly for an automotive vehicle, comprising:
   a sun visor provided with a substantially vertically positionable driver-confronting surface;
   a tinted transparent light shield disposed substantially parallel to said surface;
   fastening means including a single projecting permanently magnetized stud affixed to said light shield, and a narrow ferrometallic strip extending generally vertically along said surface and adapted to adhere magnetically to said stud whereby said stud is rotatable about its axis and shiftable vertically along said strip, said strip and said stud constituting the sole means for securing said shield to said visor; and
   a hinge having frictionally articulated arms connecting said stud with said shield.

(References on following page)

References Cited

UNITED STATES PATENTS

| | | | |
|---|---|---|---|
| 2,212,007 | 8/1940 | Buchanan | 296—97 |
| 2,603,530 | 7/1952 | Jones | 296—97 |
| 2,701,612 | 2/1955 | Steidl | 296—97 X |
| 2,894,576 | 7/1959 | Williams | 296—97 X |
| 2,941,839 | 6/1960 | Pendlebury | 296—97 |
| 2,965,235 | 12/1960 | Daline | 248—206 X |
| 3,071,408 | 1/1963 | Turner | 296—97 |
| 3,259,424 | 7/1966 | Swick | 296—97 |

FOREIGN PATENTS 1,111,457  10/1955  France.

BENJAMIN HERSH, *Primary Examiner.*

J. A. PEKAR, *Assistant Examiner.*